Aug. 11, 1942.　　　C. E. HEITMAN, JR　　　2,292,834
POWER DISTRIBUTION SYSTEM
Filed Feb. 12, 1940
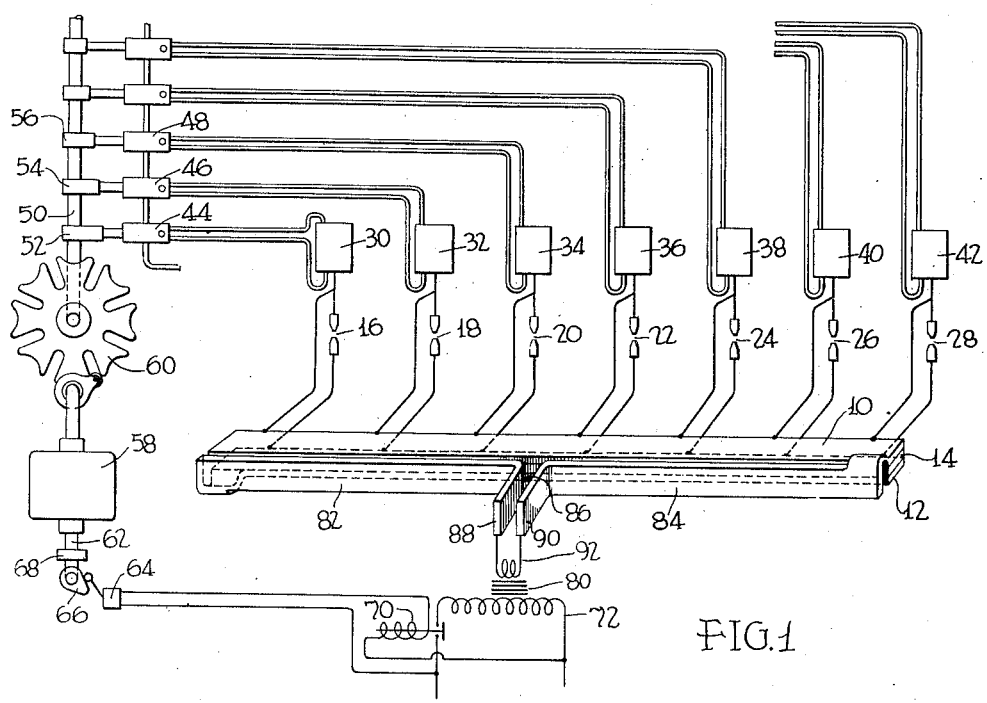
FIG.1
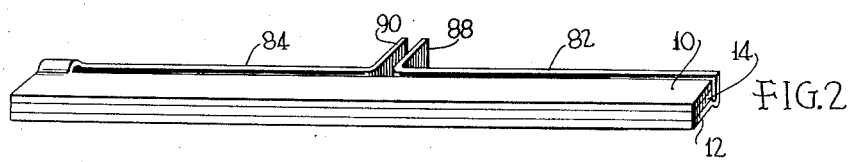
FIG.2
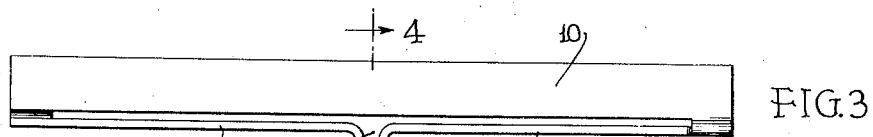
FIG.3
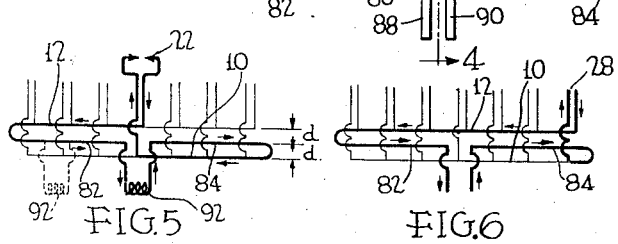
FIG.5　　FIG.6
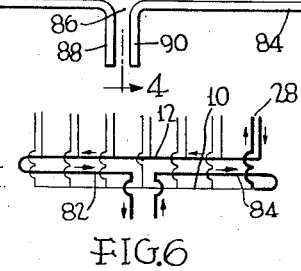
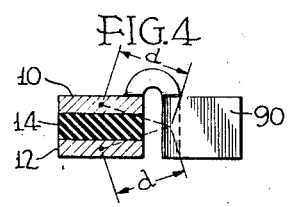
FIG.4
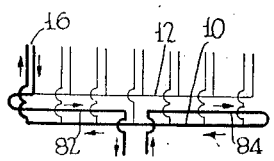
FIG.7
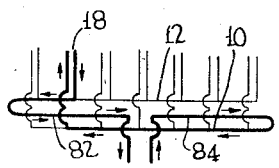
FIG.8
INVENTOR
Charles E. Heitman Jr.
BY John P. Tarbox
ATTORNEY Patented Aug. 11, 1942

2,292,834

UNITED STATES PATENT OFFICE 2,292,834

POWER DISTRIBUTION SYSTEM

Charles E. Heitman, Jr., Philadelphia, Pa., assignor to Edward G. Budd Manufacturing Company, Philadelphia, Pa., a corporation of Pennsylvania Application February 12, 1940, Serial No. 318,473

5 Claims. (Cl. 171—97)

This invention relates to distribution of heavy power to electrical apparatus arranged in multiple and more particularly to the uniform distribution of current to a multiple number of units arranged along a distribution bus bar and in which the units are supplied with current one at a time.

In multiple spot welding apparatus it is usual to connect a plurality of welding guns or pairs of welding electrodes to a single transformer through a common bus bar and distribute the current to the various welding guns or electrode pairs by actuating a single gun at a time and simultaneously applying the power to the bus bar from the transformer. Thus, a single transformer may supply the welding energy to a plurality of welding guns which may be actuated one at a time in succession. Apparatus of this nature is disclosed in pending applications of William A. Weightman, Serial No. 143,600, filed May 19, 1937, and Serial No. 291,838, filed August 25, 1939.

Because of the heavy power consumption and exceedingly heavy currents flowing in the bus bars of such distribution systems the fact that one welding gun is located at one position of the bus bar and another one located at a different and non-symmetrical position there results a non-uniform distribution of power to the various guns the resistance and inductance of the system varying with the length of current travel and the interrelation of the conductors. The present invention is directed to an arrangement wherein such inequalities as would result in the ordinary heavy current distribution bus bars are completely eliminated.

Accordingly, it is an object of the present invention to provide a bus bar construction for multiple units of electrical apparatus adapted for operation sequentially or at different times in which reactance characteristics of the bus bar are substantially the same, regardless, of which unit power is distributed to, or where connection is made to the bus bar.

Another object of the invention is to provide a bus bar in which connections are made thereto from a power source in such a way as to provide uniform impedance characteristics regardless of where power is distributed from the bus bar.

A further object of the invention is to provide a bus bar having uniform current distribution characteristics in which the connections made thereto are of a relatively simple nature and adapted to the transmission of heavy currents.

The above and other novel features of the invention will appear more fully hereinafter from the following detailed description when taken in conjunction with the accompanying drawing. It is expressly understood however, that the drawing is employed for purposes of illustration only and is not designed as a definition of the limits of the invention, reference being had for this purpose to the appending claims.

In the drawing wherein similar reference characters have reference to similar parts throughout the several views;

Fig. 1 is a perspective view of a bus bar constructed in accordance with the invention and its diagrammatic arrangement in a particular form of electrical apparatus;

Fig. 2 is a perspective view of the bus bar of Fig. 1 taken from another side thereof;

Fig. 3 is a top plan view of the bus bar of Figures 1 and 2;

Fig. 4 is a section taken on the line 4—4 of Fig. 3 illustrating the cross section of the bus bar;

Figs. 5, 6, 7 and 8 are diagrammatic illustrations showing the path of current flow to the bus bar, therethru, and from the bus bar to various units arranged in various positions therealong.

Referring to the drawing, and particularly Fig. 1 thereof, there will be seen a bus bar construction having a top conductor 10 and a bottom conductor 12 separated electrically from one another by insulation such as 14, but otherwise parallel to one another. To the top and bottom conductors 10 and 12, a plurality of pairs of welding electrodes 16, 18, 20, 22, 24, 26 and 28 are connected. A step down welding transformer 80 is connected to the bus conductors 10 and 12 of the bus bar through connecting conductors 82 and 84, the connecting conductor 82 being connected to the bus conductor 12 and the connecting conductor 84 being connected to the bus conductor 10. The conductors 82 and 84 in effect constitute a divided conductor or one having therein a short gap the same being divided at 86 for the purpose of connection through the laterally extending terminal portions 88 and 90 to the secondary 92 of the welding transformer 80.

It will be observed that the connecting conductors 82 and 84 connect to the bus bar conductors 10 and 12 at their opposite ends and additionally the connecting conductors 82 and 84 lie closely parallel to and at an equal distance $d$ from either of the conductors 10 and 12 as is illustrated particularly in Figs. 3 and 4. Further explanation of this construction and its advantages will appear hereinafter.

As disclosed in the above referred to copending applications the welding guns 16 to 28 are adapted to be actuated in sequence through fluid pressure motors 30 to 42 connected to the valves for controlling the fluid pressure 44, 46, 48 etc. which valves may be actuated by a cam shaft 50 carrying cams 52, 54, 56, etc. The cam shaft may be driven from a motor 58 through a Geneva movement 60 such that cams 52, 54 and 56 are adapted to sequentially actuate the valves 44, 46, 48, etc. so as to cause the engagement of the pairs of welding electrodes 16, 18, 20 etc. one at a time with the work in which welds are to be effected.

The motor driven shaft 62 in addition to actuating the cam shafts through the Geneva movement actuates a welding transformer control switch 64 through the cam 66, which cam by reason of a suitable gear box 68 actuates the welding transformer control once during each application of a pair of welding electrodes to the work. The cam operated switch 64 is thus synchronized so as to effect energization of the bus bars through some suitable relay 70 arranged in the primary circuit 72 of the welding transformer at such time only as a pair of welding electrodes is in engagement with the work. The cam shaft and fluid pressure control of the pair of welding electrodes is adapted to engage but a single pair of welding electrodes with the work at any one time.

In order to illustrate the manner in which the individual pairs of welding electrodes are supplied with welding current through the uniform distribution system regardless of their position along the bus bar, attention is drawn to Figs. 5, 6, 7 and 8. In Figure 5, the central pair of welding electrodes 22 is illustrated as being energized. The current enters the bus bar from the transformer through the connecting conductor 84 which extends parallel with the length of the bus bar and current thereafter is fed to one of the electrodes 22 through the right-hand portion of the bus bar conductor 10. The current returns to the transformer from the other welding electrode of the pair of electrodes 22 through the left-hand portion of the bus bar conductor 12 and thence through the connecting conductor 82 back to the transformer secondary 92. Thus the current travelled distance in the bus bar is equal to the length of either conductor 10 or 12. Referring to Figs. 6, 7, and 8, it will appear that no matter where the location of the welding electrodes are, for example, the pair 28 in Fig. 6 or the pair 16 in Fig. 7 or the pair 18 in Fig. 8, the actual current travelled portion of the conductor bars 10 and 12 together equals exactly the total length of either bar. Thus the resistance of the circuit is maintained constant no matter where connection is made to the bus bar conductors.

In addition to the resistance being constant, by locating the connecting conductors 82 and 84 closely parallel to the bus conductors 10 and 12, and equally spaced from both bus conductors uniform reactance results regardless of where connection is made to the bus bar conductors 10 and 12. This is illustrated, for example, in Figs. 5, 6, 7 and 8, also, since it will appear, for example, in Fig. 5 that the current flow in the left-hand portion of the conductor 12 is equal and opposite to the current flow in the connecting conductor 82 which is immediately adjacent to the bus conductor 12 and parallel therewith. The current flow in the bus conductor 12 and the current flow in the connecting conductor 82 because of their proximity and opposite direction of flow lowers the reactance of the two conductors. Similarly, the current flow in the right-hand portion of the bus conductor 10 is equal and in an opposite direction to the current flow in the immediately adjacent conductor 84 and thus the reactance of this branch of the circuit is lowered. Referring to Figs. 6, 7 and 8, it will be seen how the conditions are the same regardless of where connection is made to the bus conductors 10 and 12. Where connection is made at the right-hand end of the bus conductors as is shown in Fig. 6 the current flow in the conductor 12 throughout the length is in the opposite direction to the current flow in the adjacent connecting conductors 82 and 84 which parallel the bus conductors throughout the length. The same will appear to be true in Figs. 7 and 8. To further reduce the reactance of the connecting conductors the laterally extending portions of the connecting conductors 88 and 90 are arranged close together to reduce the reactance. As is indicated in Fig. 4 and diagrammatically shown in Figs. 5–8, the spacing between the conductors carrying the opposed current is fixed, and since this spacing is the same regardless of whether conductor 10, or 12, carries the current, and since the current travel path is the same, constant reactance must result.

The diagrams of Figs. 5, 6, 7 and 8 illustrate the bus conductors 10 and 12, equally distant from the connecting conductors 82 and 84. It will appear obvious from a view of Figs. 1–4 that the connecting conductors are best so arranged as to be as close to the bus conductors 10 or 12 as possible since the reactance is thereby lowered. One reason for the reactance being lowered when the bars 82 and 84 are as close as possible to the bus bars 10 and 12, is that when carrying heavy currents as in welding and their separation from the bus bars is not much more than enough to prevent an arc-over, the flux around these bars becomes so crowded in the intervening space as to result in a reduction in the total flux that would otherwise exist in the bus bars. While the connections 88 and 90 to the transformer are illustrated centrally, the connecting conductors 82 and 84 may be divided at any point without disturbing the constant reactance relationship of the circuit. For example the transformer could be connected as at 92' in Fig. 5 with the same results. Thus by the unique yet simple arrangement, which while involving in some instances longer leads, uniform distribution of power is obtained.

In the art of spot welding where especially heavy currents are employed for short intervals of time a lack of being able to supply identical currents to various welding guns seriously menaces the chances of making consistent welds and this danger is considerably reduced or avoided by the bus construction of this invention.

While the bars 82 and 84 have been designated herein as "connecting conductors" and they have been said to be "connected" to the bus bars 12 and 10, it will be understood that no separable connection is necessary between the conductors 82 and 84 and their respective bus bars since the drawing shows the conductor 84 as being integral with the bus bar 10 and the conductor 82 as being similarly integrally connected with the bus bar 12 (see Figures 2, 3 and 4).

Though only a single modification of the invention has been illustrated and described, it is to be understood that the invention is not limited thereto, but may be embodied in various alternatives or other mechanical forms. As many changes in construction and arrangement of parts may be made without departing from the spirit of the invention as will be well understood by those skilled in the art, reference will be had to the appended claims for a definition of the limits of the invention.

What is claimed is:

1. In a multiple load circuit, a pair of parallel bus bars spaced from one another, a plurality of loads connected in parallel to said bus bars in similar fashion along the length thereof, a power source, and means connecting said source to each of said bus bars at opposed ends thereof, said means having a portion thereof extending along the length of and closely adjacent to and substantially equally spaced from both bus bars, whereby current paths from the source to any one of the loads have substantially the same impedance as any other path.

2. In a multiple electrical load apparatus, a pair of parallel bus bars for feeding a plurality of substantially uniformly arranged loads, arranged in parallel across and along the length of the bus bars, current feeding means for said bus bars having a portion extending parallel to and in close proximity to and substantially equally spaced from both bus bars, said means comprising a divided conductor, one end of said conductor being connected to the one end of the one bar and the other end of said conductor to the other end of the other bar and a source of power connected across the divide whereby a uniform impedance path to each load is provided.

3. The combination with a pair of adjacent bus bars for heavy alternating currents, of load connections at substantially opposite locations along said bus bars, and connecting bars for said bus bars, each connecting bar being substantially equally and closely spaced from each bus bar and arranged in a plane normal to the planes of said bus bars, one connecting bar connected to an end portion of one bus bar and extending from such end portion to adjacent a longitudinal intermediate portion of the bus bars, the other connecting bar extending from the opposite end of the other bus bar close to said pair of bus bars, in alinement with the first connecting bar and to adjacent the same longitudinal intermediate portion of said bus bars, and a source of alternating current connected to said connecting bars, whereby the resistance and reactance from said source to any load connection along the bus bars is substantially the same as such resistance and reactance to any other load connection spaced from the first mentioned load connection along said bus bars.

4. In a construction comprising a pair of bus bars along which loads may be connected at substantially opposite locations, the improvement whereby a pair of supply conductors may be connected with the pair of bus bars with reduced and uniform impedance for any load on the bus bars and whereby the magnetic field around said bus bars due to a given load is reduced, which comprises a third bar connected at one end to one of the bus bars and at the other end to the other bus bar, said third bar being substantially parallel to the bus bars, arranged closely and equally spaced from each of the bus bars and said third bar being provided with a short gap therein across which the supply conductors are connected.

5. In combination, a pair of adjacent substantially parallel bus bars for heavy alternating current, said bars being adapted for the connection of loads across a plurality of adjacent points along their length, means adapted for connecting opposite ends of said bus bars to a source of current, said means comprising a third bar arranged substantially parallel to and closely and substantially equally spaced from each of the bus bars whereby for any load connection points the aggregate distance to the connections with the source of power and consequently the resistance is about the same, whereby furthermore for any such points the current flows in opposite directions in adjacent portions of each two bars so that the impedance becomes uniform and so that the impedance of and the magnetic field around said bus bars for any given load are reduced.

CHARLES E. HEITMAN, Jr.